(12) United States Patent
Astrike (10) Patent No.: US 11,267,523 B2
(45) Date of Patent: Mar. 8, 2022

(54) POSITIONING STRUCTURES THAT ALLOW FOR TEMPORARY PLACEMENT OF OVERHEAD PANELS

(71) Applicant: Toyota Motor Engineering & Manufacturing North America, Inc., Plano, TX (US)

(72) Inventor: Logan R. Astrike, Dexter, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 98 days.

(21) Appl. No.: 16/451,716

(22) Filed: Jun. 25, 2019

(65) Prior Publication Data
US 2020/0406998 A1 Dec. 31, 2020

(51) Int. Cl.
*B62D 65/14* (2006.01)
*F16B 5/00* (2006.01)
*B62D 65/02* (2006.01)
*B60R 13/02* (2006.01)

(52) U.S. Cl.
CPC ............ *B62D 65/14* (2013.01); *F16B 5/0096* (2013.01); *B60R 13/0212* (2013.01); *B62D 65/024* (2013.01); *B62D 65/026* (2013.01)

(58) Field of Classification Search
CPC .... B62D 65/02; B62D 65/024; B62D 65/026; B62D 65/06; B62D 65/14; F16B 5/0096; F16B 5/0607; F16B 5/0621; F16B 5/0642; F16B 5/065
See application file for complete search history.

(56) References Cited

U.S. PATENT DOCUMENTS

| 2,043,007 | A |   | 6/1936 | Place |
|-----------|---|---|--------|-------|
| 5,186,517 | A | * | 2/1993 | Gilmore ................. B60R 11/00 24/295 |
| 5,433,571 | A |   | 7/1995 | Allison |
| 7,922,135 | B2 |  | 4/2011 | Granata |

(Continued)

FOREIGN PATENT DOCUMENTS

| FR | 745896 A | 5/1933 |
|----|----------|--------|
| JP | H0642434 U | 6/1994 |

(Continued)

*Primary Examiner* — Christopher J Besler
(74) *Attorney, Agent, or Firm* — Dinsmore & Shohl LLP (57) ABSTRACT

A method of installing an overhead panel to another panel is provided. The method includes connecting a base of a positioning structure to a surface of the overhead panel. The positioning structure includes the base, a stem that extends outwardly from the base and an enlarged head that extends outwardly from the stem and overhangs the base. The enlarged head of the positioning structure is moved against a ledge of the another panel. The ledge contacts the enlarged head and moves the enlarged head from a catch configuration to an insertion configuration where the enlarged head reduces in dimension. The enlarged head is passed by the ledge such that the enlarged head moves from the insertion configuration to the catch configuration of increased dimension. The enlarged head is hung on the ledge such that the positioning structure supports the overhead panel in a pre-installation position that is different from an installed position.

14 Claims, 6 Drawing Sheets

(56) References Cited

U.S. PATENT DOCUMENTS

2005/0225061 A1* 10/2005 Hofmann .............. B60R 21/213
                                                    280/728.2
2006/0103172 A1   5/2006 Veen et al.
2013/0287518 A1* 10/2013 Scroggie ................ B23P 19/08
                                                    411/78

FOREIGN PATENT DOCUMENTS

| JP | 2001241420 A | 9/2001 |
| KR | 19980052309 U | 10/1998 |
| KR | 20180066349 A | 6/2018 |

* cited by examiner

POSITIONING STRUCTURES THAT ALLOW FOR TEMPORARY PLACEMENT OF OVERHEAD PANELS

TECHNICAL FIELD

The present specification generally relates to positioning structures, and more specifically, positioning structures that allow for temporary placement of overhead panels, such as headliners.

BACKGROUND

A headliner is a panel that covers a roof of a vehicle. Headliners may be formed of layers of material and may include a fabric on an interior facing side to provide a soft touch. Headliners are typically affixed to a roof panel that is overhead from inside the vehicle. Due to the size of the headliners and position overhead at least part of their installation may be obscured by the headliners themselves. Additionally, the headliners may tend to sag at certain locations and complicate the installation process.

Accordingly, a need exists for positioning structures that allow for temporary placement of overhead panels, such as headliners.

SUMMARY

In one embodiment, a method of installing an overhead panel to another panel is provided. The method includes connecting a base of a positioning structure to a surface of the overhead panel. The positioning structure includes the base, a stem that extends outwardly from the base and an enlarged head that extends outwardly from the stem and overhangs the base. The enlarged head of the positioning structure is moved against a ledge of the another panel. The ledge contacts the enlarged head and moves the enlarged head from a catch configuration to an insertion configuration where the enlarged head reduces in dimension. The enlarged head is passed by the ledge such that the enlarged head moves from the insertion configuration to the catch configuration of increased dimension. The enlarged head is hung on the ledge such that the positioning structure supports the overhead panel in a pre-installation position that is different from an installed position.

In another embodiment, a positioning structure for placing a headliner of a vehicle in a pre-installed position includes a base, a stem that extends outwardly from the base and an enlarged head that extends outward from the stem and overhangs the base. The enlarged head includes an outwardly extending portion that extends from the stem and overhangs the base and an inwardly extending portion that extends from the outwardly extending portion toward the stem and under hangs the outwardly extending portion.

In another embodiment, a positioning structure for placing a headliner of a vehicle in a pre-installed position includes a base, a stem that extends outwardly from the base and an enlarged head that extends outward from the stem and overhangs the base. The enlarged head includes a first outwardly extending portion that extends in a first direction and a second outwardly extending portion that extends in a second direction that is opposite the first direction. The enlarged head pivots about a hinge that is connected to the stem between a catch configuration and an insertion configuration.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include positioning structures that allow for temporary placement of overhead panels, such as headliners. The positioning structures include a base and a stem that extends outwardly from the base. The base may be connected to a headliner (or other overhead panel) at a surface that faces outwardly away from a user. A head may be provided at an end of the stem. The head may be formed such that the head overhangs the base. The head may be sized to be inserted through an opening and alongside a ledge in an insertion configuration. Once the ledge is cleared, the head may move into a catch configuration where the head engages the ledge and supports the headliner in a pre-installation position. The headliner may then be moved into an installed position with the positioning structure left in place. However, the positioning structure may no longer be supporting any of the load of the headliner with the headliner in the installed position.

Figure 1:
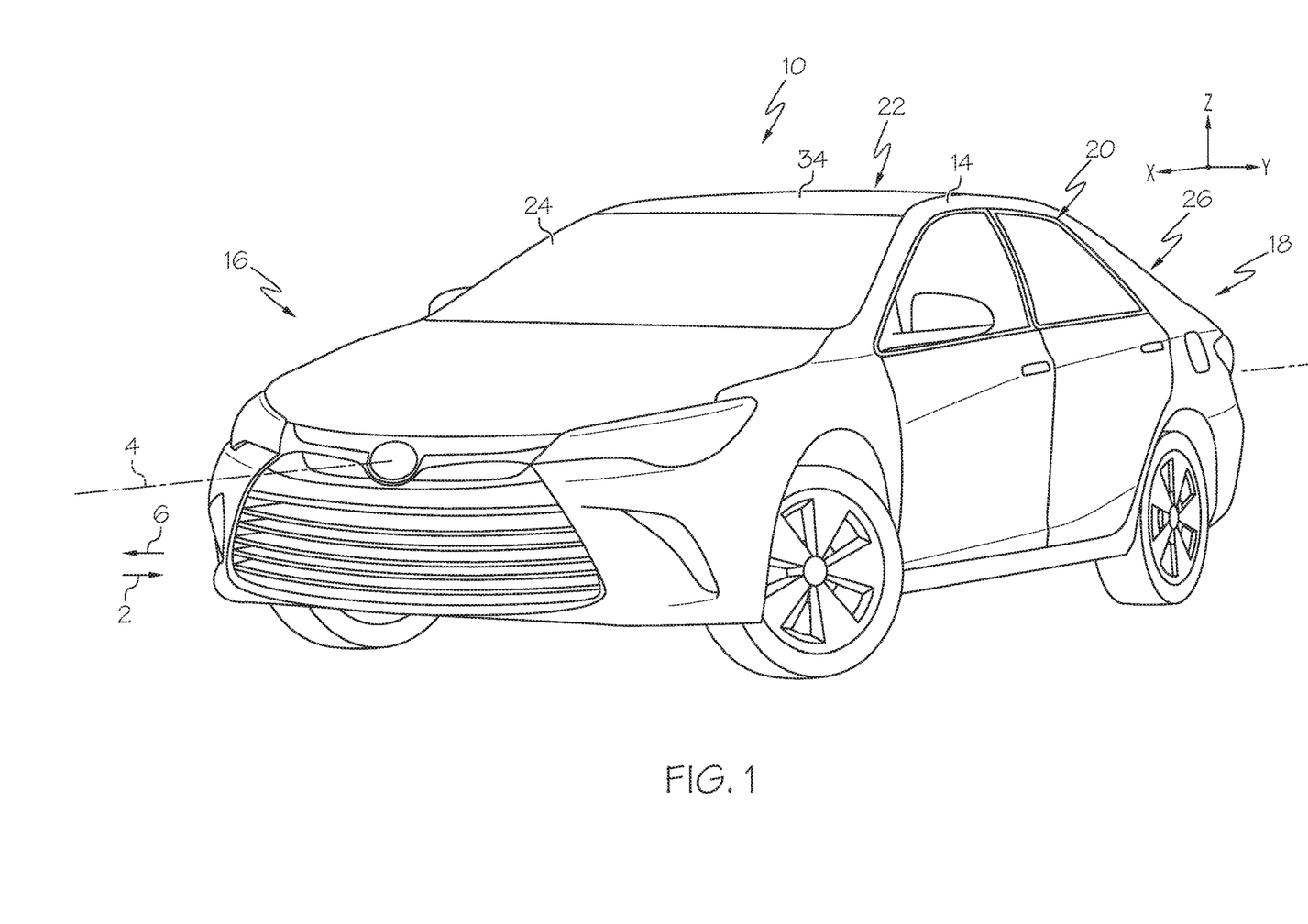
FIG. 1 illustrates a perspective view of a vehicle, according to one or more embodiments shown and described herein.

As used herein, the term "vehicle longitudinal direction" refers to the forward-rearward direction of the vehicle (i.e., in the +/−vehicle X-direction depicted in FIG. 1). The term "vehicle lateral direction" refers to the cross-vehicle direction (i.e., in the +/−vehicle Y-direction depicted in FIG. 1), and is transverse to the vehicle longitudinal direction. The term "vehicle vertical direction" refers to the upward-downward direction of the vehicle (i.e., in the +/−vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

The vehicle 10 may include a body framework 14 and have a front 16, a rear 18 and sides 20 that extend between the front 16 and the rear 18. A roof assembly 22 of the vehicle 10 extends between the sides 20 and between a front windshield 24 and a rear window 26. A headliner 30 (FIG. 5) is located interior to an exterior panel 34. As will be described in greater detail below, the headliner 30 may be held in a pre-installation position using a temporary positioning structure. The positioning structure is "temporary" in that it supports a load of the headliner for a limited period of time until the headliner is placed in an installed position as part of the roof assembly.

Figure 2:
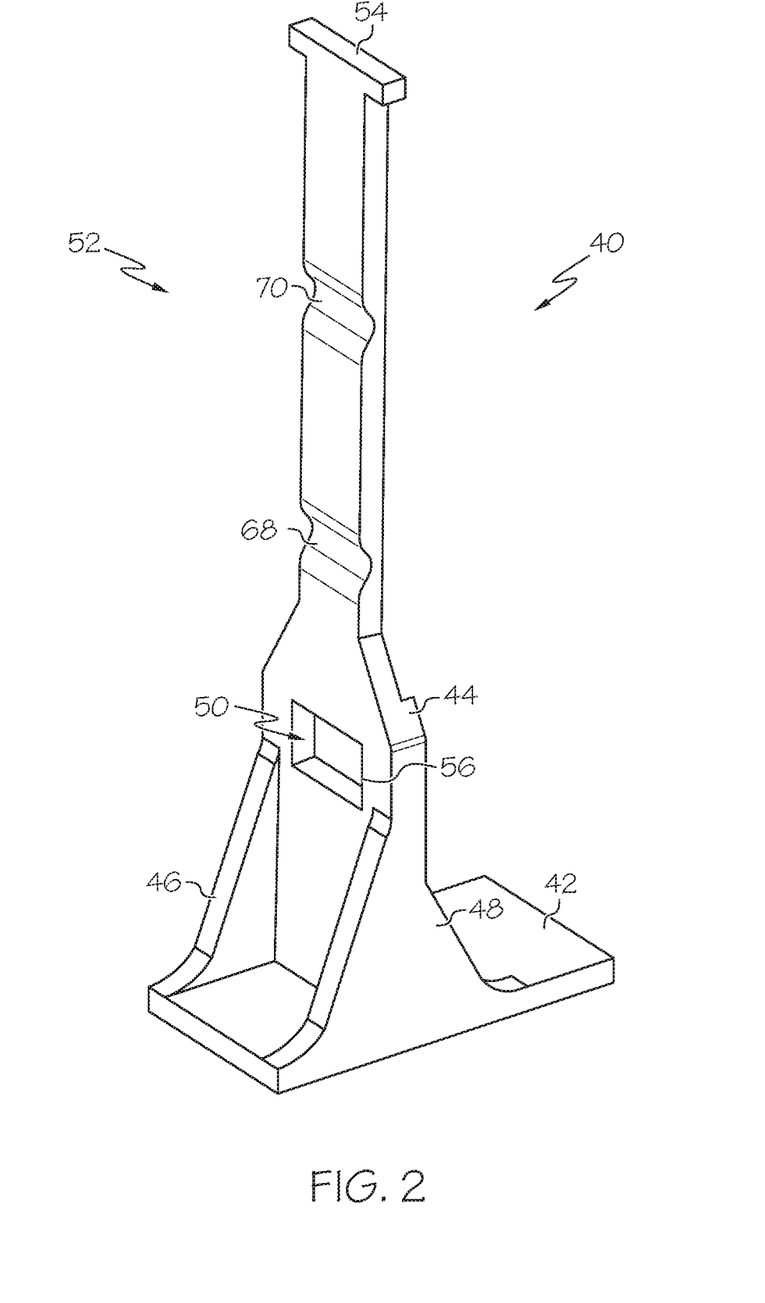
FIG. 2 is a perspective view of a positioning structure, according to one or more embodiments shown and described herein.

Referring to FIG. 2, in one embodiment, a positioning structure 40 includes a base 42 and a stem 44 that extends outwardly from the base 42. Reinforcement ribs 46 and 48 may further connect the stem 44 and the base 42 and provide lateral reinforcement for the stem 44. In some embodiments, the stem 44, base 42 and reinforcement ribs 46 and 48 are a monolithic single piece structure all formed of the same material, such as by molding. An opening 50 is formed through the stem 44.

A head forming portion 52 extends outwardly from the stem 44. The head forming portion 52 includes an enlarged catch member 54 having a width that is greater than a width of the head forming portion 52 adjacent the enlarged catch member 54. The width of the enlarged catch member 54 may be greater than a width of the opening 50 to catch against a perimeter 56 of the opening when inserted therethrough.

The head forming portion 52 includes increased flexibility regions 68 and 70. The increased flexibility regions 68 and 70 may be formed by a reduced material thickness so that the head forming portion 52 tends to bend more at the increased flexibility regions.

Figure 3:
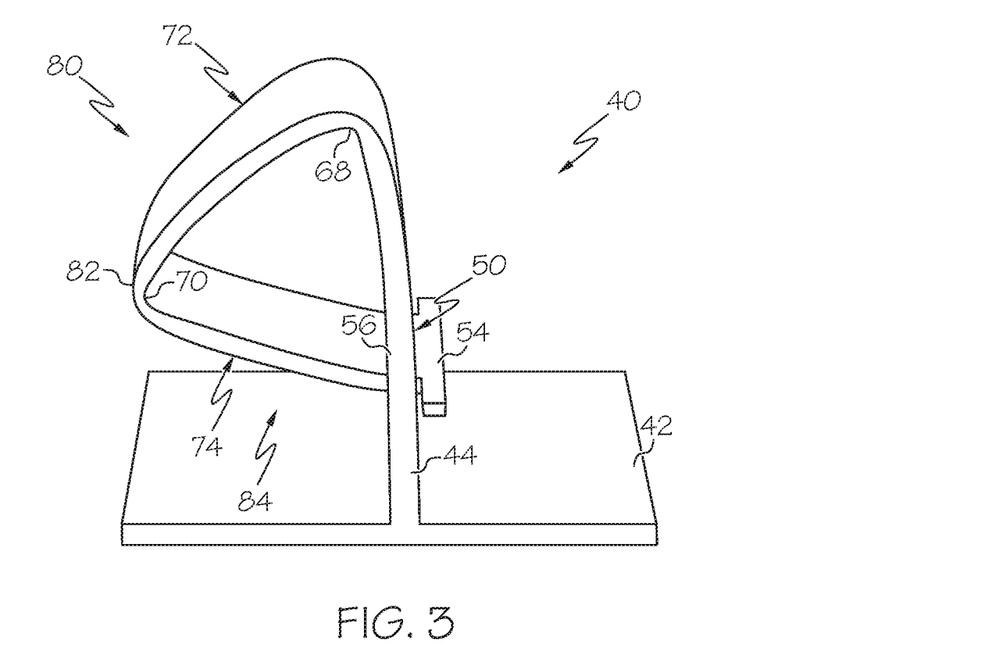
FIG. 3 is a perspective view of the positioning structure of FIG. 2 in a catch configuration, according to one or more embodiments shown and described herein.

FIG. 2 illustrates the head forming portion 52 in a laid-out configuration. Referring to FIG. 3, the positioning structure 40 is illustrated with the reinforcement ribs removed for clarity. The head forming portion 52 may be bent over the base 42 at the increased flexibility region 68. The head forming portion 52 may be bent over the base 42 to form an outwardly extending portion 72 that extends outwardly from the stem 44 to overhang the base 42. The head forming portion 52 may be further bent at the increase flexibility region 70 to form an inwardly extending portion 74 that extends inwardly toward the stem 44 to overhang the base 42. The enlarged catch member 54 may be inserted into the opening 50 through the stem 44. While the enlarged catch member 54 may be wider than the opening 50 to catch the perimeter 56 and inhibit removal of the enlarged catch member 54 back through the opening 50, the regions adjacent the enlarged catch member 54 may be narrower than the width of the opening 50 to facilitate sliding of the head forming portion 52 relative to the opening 50 when inserted therethrough.

As can be appreciated, insertion of the head forming portion 52 into the opening 50 forms an enlarged head 80 that overhangs the base 42. The head 80 and the stem 44 form a 4-shape having a terminal end 82 and the inwardly extending portion 74 that under hangs the outwardly extending portion 72. The inwardly extending portion 74 is spaced from the base 42 and provides a gap 84 to receive a ledge of the roof structure.

FIG. 3 illustrates the head 80 in a catch configuration where, in this embodiment, the head 80 is expanded. As can be seen, the outwardly extending portion 72 extends both outwardly from the stem 44 and also vertically toward the base 42 forming a tapered shape. This tapered shape can facilitate insertion of the head 80 through openings that are narrower in dimension than the depth of the head 80 from the terminal end 82 of the head 80 to the stem 44.

Figure 4:
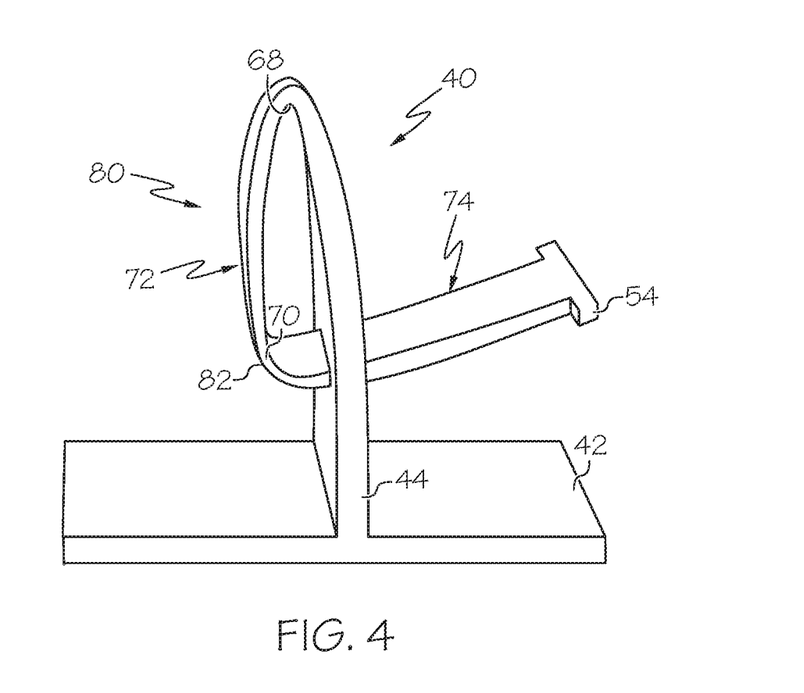
FIG. 4 is a perspective view of the positioning structure of FIG. 2 in a insertion configuration, according to one or more embodiments shown and described herein.

In this regard, referring to FIG. 4, the head 80 has an insertion configuration where the depth of the head 80 is reduced or compressed to facilitate insertion through smaller openings. The head forming portion 52 being narrower than the opening 50 can slide relative to the opening 50 in response to a force applied to the outwardly extending portion 72 thereby reducing the depth of the head 80.

Figure 5:
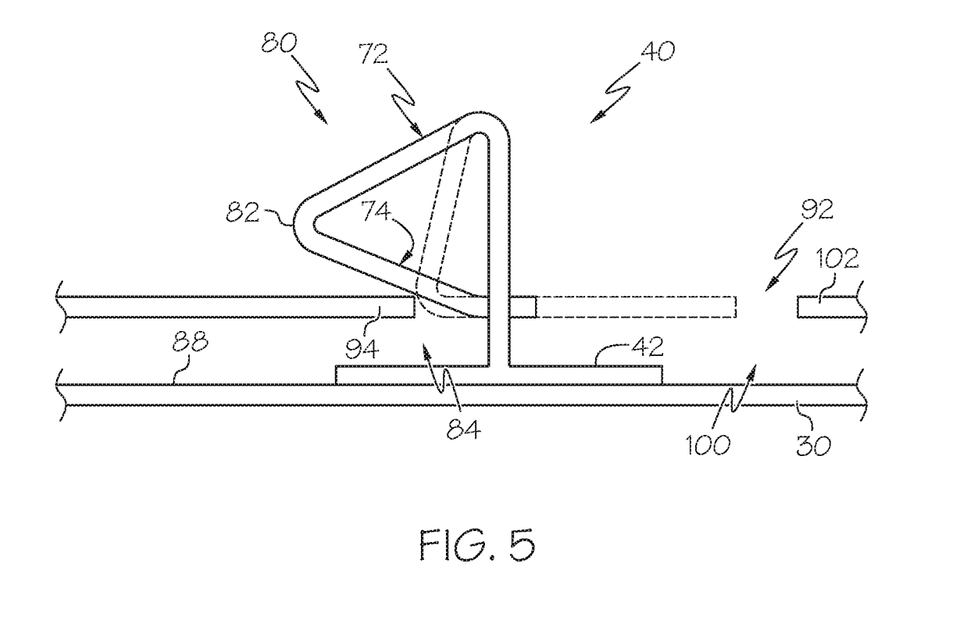
FIG. 5 is a side view of the positioning structure of FIG. 2 in use, according to one or more embodiments shown and described herein.

Referring to FIG. 5, the positioning structure 40 is shown in use and includes the base 42 that is connected to an exterior facing surface 88 of a headliner 30. The base 42 may be connected to the exterior facing surface 88 of the headliner 30 using any suitable method, such as an adhesive, fastening, etc. The head 80 of the positioning structure 40 may be inserted through an opening 92. Because the head 80 engages a ledge 94 as it is inserted into the opening 92, the head 80 moves from the catch configuration to the narrower insertion configuration (shown by dashed lines) as the outwardly extending portion 72 engages the ledge 94 of the opening 92 and the head 80 is being pushed through the opening 92. Once the head 80 is through the opening 92 and the terminal end 82 is past the ledge 94, the head 80 can expand into the catch configuration due to the resiliency of the material forming the positioning structure 40. In the catch configuration, the inwardly extending portion 74 rests on the ledge 94 with the ledge received within the gap 84 thereby supporting a weight of the headliner 30. The positioning structure 40 can continue to support the headliner 30 in this pre-installed position until the headliner 30 is moved into an installed position that reduces a space 100 between the headliner 30 and roof panel 102 to which the headliner 30 is being assembled. With the headliner 30 in the installed position, the weight of the headliner 30 is no longer supported by the positioning structure 40 and the positioning structure 40 remains connected to the headliner 30.

Figure 6:
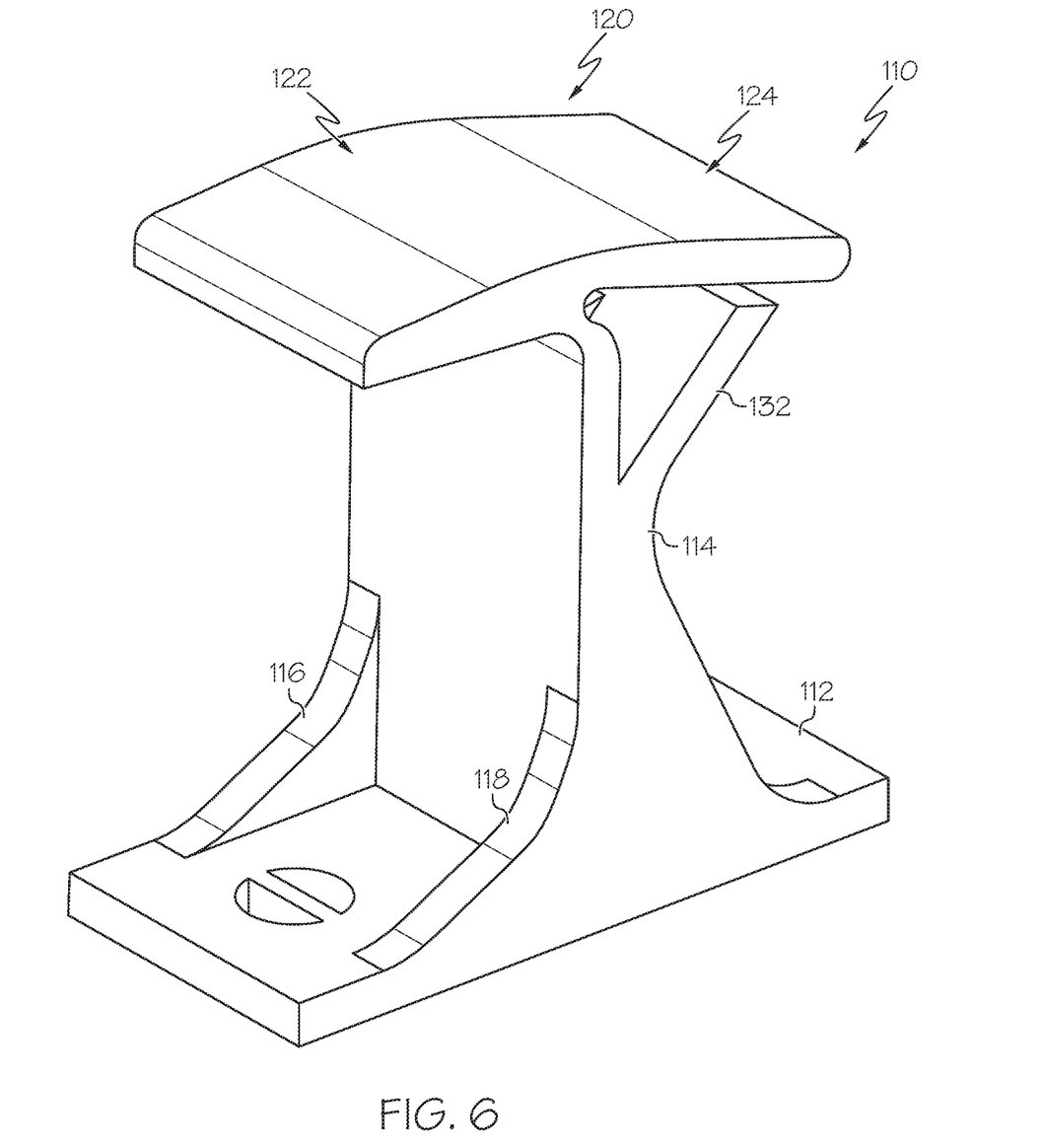
FIG. 6 is a perspective view of another positioning structure, according to one or more embodiments shown and described herein.

Referring to FIG. 6, another embodiment of a positioning structure 110 is illustrated that includes a base 112 and a stem 114 that extends outwardly from the base 112. Reinforcement ribs 116 and 118 may further connect the stem 114 and the base 112 and provide lateral reinforcement for the stem 114. In some embodiments, the stem 114, base 112 and reinforcement ribs 116 and 118 are a monolithic single piece structure all formed of the same material, such as by molding.

Figure 7:
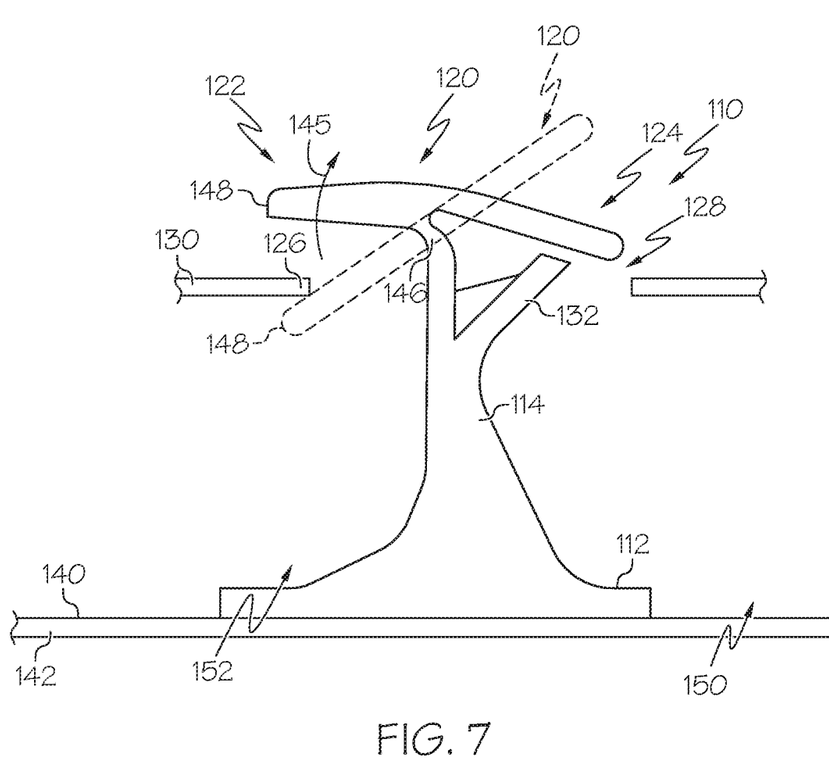
FIG. 7 is a side view of the positioning structure of FIG. 6 in use, according to one or more embodiments shown and described herein.

Referring also to FIG. 7, a head 120 extends outward from the stem 114 in opposite directions. The head 120 includes a first outwardly extending portion 122 and a second outwardly extending portion 124 that extends in an opposite direction from the first outwardly extending portion 122. The first outwardly extending portion 122 engages a ledge 126 of an opening 128 in a roof panel 130. The second outwardly extending portion 122 can engage a load support member 132 when the first outwardly extending portion 122 is engaged with the ledge 126. The load support member 132 inhibits movement of the second outwardly extending portion 124 toward the base 112 to support the first outwardly extending portion 122 in a catch configuration.

FIG. 7 illustrates the positioning structure 110 in use and includes the base 112 that is connected to an exterior facing surface 140 of a headliner 142. The base 112 may be connected to the exterior facing surface 140 of the headliner 142 using any suitable method, such as an adhesive, fastening, etc. The head 120 of the positioning structure 110 may be inserted through the opening 128. The head 120 moves (pivots) from the catch configuration to an insertion configuration (shown by dashed lines) as the first outwardly extending portion 122 engages the ledge 126 of the opening 128 and the head 120 is being pushed through the opening 128. A hinge 146 (a living hinge) may be provided to facilitate pivoting of the first outwardly extending portion 122. The hinge 146 may be formed as a region of reduced thickness.

Once the head 120 is through the opening 128 and a terminal end 148 is past the ledge 126, the head 120 can rotate into a catch configuration due to the resiliency of the material forming the positioning structure 110. In the catch configuration, the first outwardly extending portion 122 hangs on the ledge 126 with the ledge received within a gap 152 thereby supporting a weight of the headliner 142. In some embodiments, the second outwardly extending portion 124 rests on the load support member 132 to inhibit rotation of the first outwardly extending portion 122 away from the catch configuration in the direction of arrow 145. The positioning structure 110 can continue to support the headliner 142 in this pre-installed position until the headliner 142 is moved into an installed position (illustrated by FIG. 7) that reduces a space 150 between the headliner 142 and roof panel 130 to which the headliner 142 is being assembled. With the headliner 142 in the installed position, the weight of the headliner 142 is no longer supported by the positioning structure 110 and the positioning structure 110 remains connected to the headliner 142.

The above-described positioning structures are used during headliner assembly into the vehicle and then become non-functional after assembly. The positioning structures may be monolithic, single-piece structures that are molded from a plastic material. The positioning structures are adhered to an exterior facing surface of the headliner and act as a temporary clip that holds a portion (e.g., middle) of the headliner in place in a pre-installed position, limiting sag of the headliner. Headliners may tend to sag in the middle during installation because the extreme ends (the front and back) may be installed first leaving little to no support in the middle without the positioning structures. The can be a particular issue for relatively long headliners (e.g., SUV, minivan, etc.). The positioning structures can avoid headliner sagging and damage to the headliner by supporting the headliner in the pre-installation position during installation.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of installing an overhead panel to another panel, the method comprising:
    connecting a base of a positioning structure to a surface of the overhead panel, the positioning structure comprising:
    the base;
    a stem that extends outwardly from the base; and
    an enlarged head that extends outwardly from the stem and overhangs the base;
    moving the enlarged head of the positioning structure against a ledge of the another panel, the ledge contacting the enlarged head and moving the enlarged head from a catch configuration to an insertion configuration where the enlarged head reduces in dimension;
    passing the enlarged head by the ledge such that the enlarged head moves from the insertion configuration to the catch configuration of increased dimension;
    hanging the enlarged head on the ledge such that the positioning structure supports the overhead panel in a pre-installation position that is different from an installed position; and
    moving the overhead panel from the pre-installation position into the installed position by reducing spacing between the surface of the overhead panel and the another panel thereby spacing the enlarged head from above the another panel in a vertical direction and removing a load provided by a weight of the overhead panel from the positioning structure.

2. The method of claim 1, wherein the positioning structure remaining connected to the overhead panel with the overhead panel in the installed position.

3. The method of claim 1, wherein the overhead panel is a headliner and the another panel is a roof panel of a vehicle.

4. The method of claim 1 further comprising forming the enlarged head by bending a head forming portion of the positioning structure.

5. The method of claim 1, wherein the enlarged head pivots relative to the stem between the catch configuration and the insertion configuration.

6. The method of claim 1, wherein the enlarged head compresses to the insertion configuration.

7. The method of claim 1, wherein the enlarged head comprising an outwardly extending portion that extends from the stem and overhangs the base and an inwardly extending portion that extends from the outwardly extending portion toward the stem and under hangs the outwardly extending portion.

8. The method of claim 7, wherein the enlarged head is formed from a head forming portion that extends outward from the stem, the head forming portion is a monolithic part of the stem.

9. The method of claim 8, wherein the outwardly extending portion extends from the stem at an increased flexibility region of reduced thickness in the head forming portion.

10. The method of claim 9, wherein the inwardly extending portion extends from the outwardly extending portion at another increased flexibility region of reduced thickness in the head forming portion.

11. The method of claim 8, wherein the head forming portion comprises an enlarged catch member that is received through an opening in the stem.

12. The method of claim wherein the enlarged head comprising a first outwardly extending portion that extends in a first direction and a second outwardly extending portion that extends in a second direction that is opposite the first direction;
    wherein the enlarged head pivots about a hinge that is connected to the stern between the catch configuration and the insertion configuration.

13. The method of claim 12 further comprising a load support member that extends outwardly from the stem and under hangs the second outwardly extending portion to engage the second outwardly extending portion if the enlarged head pivots away from the catch configuration.

14. The method of claim 12, wherein positioning structure is a monolithic structure.

\* \* \* \* \*

UNITED STATES PATENT AND TRADEMARK OFFICE
CERTIFICATE OF CORRECTION

| | |
|---|---|
| PATENT NO. | : 11,267,523 B2 |
| APPLICATION NO. | : 16/451716 |
| DATED | : March 8, 2022 |
| INVENTOR(S) | : Logan R. Astrike |

It is certified that error appears in the above-identified patent and that said Letters Patent is hereby corrected as shown below:

In the Claims

In Column 6, Line(s) 29, Claim 1, delete "from".

In Column 6, Line(s) 66, Claim 12, after "claim", insert --1,--.

In Column 7, Line(s) 5, Claim 12, delete "stern" and insert --stem--, therefor.

Signed and Sealed this
Fourteenth Day of June, 2022

*Katherine Kelly Vidal*

Katherine Kelly Vidal
*Director of the United States Patent and Trademark Office*